(12) United States Patent
Han et al.

(10) Patent No.: US 11,837,731 B2
(45) Date of Patent: Dec. 5, 2023

(54) CATHODE ACTIVE MATERIAL FOR LITHIUM SECONDARY BATTERY

(71) Applicant: LG CHEM, LTD., Seoul (KR)

(72) Inventors: Suenghoon Han, Daejeon (KR); Eui Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 591 days.

(21) Appl. No.: 17/257,695

(22) PCT Filed: Feb. 5, 2020

(86) PCT No.: PCT/KR2020/001639
§ 371 (c)(1),
(2) Date: Jan. 4, 2021

(87) PCT Pub. No.: WO2020/166871
PCT Pub. Date: Aug. 20, 2020

(65) Prior Publication Data
US 2021/0288327 A1    Sep. 16, 2021

(30) Foreign Application Priority Data
Feb. 13, 2019    (KR) .................. 10-2019-0016495

(51) Int. Cl.
*H01M 4/62*       (2006.01)
*H01M 4/587*      (2010.01)
*H01M 4/36*       (2006.01)
*H01M 10/052*     (2010.01)
*H01M 4/02*       (2006.01)

(52) U.S. Cl.
CPC ........... *H01M 4/625* (2013.01); *H01M 4/362* (2013.01); *H01M 4/587* (2013.01); *H01M 10/052* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 2014/0255770 A1 | 9/2014 | Lee et al. |
| 2014/0361226 A1 | 12/2014 | Takada et al. |
| 2015/0340688 A1 | 11/2015 | Rhee et al. |
| 2018/0019465 A1 | 1/2018 | Kim et al. |
| 2018/0175375 A1 | 6/2018 | Lecuyer et al. |

(Continued)

FOREIGN PATENT DOCUMENTS

| | | |
|---|---|---|
| CN | 101485985 A | 7/2009 |
| CN | 102208608 A | 10/2011 |

(Continued)

OTHER PUBLICATIONS

Bourlinos et al., "One-pot Borohydride Synthesis of Magnetically Modified Lepidocrocite", Chemistry Letters, 2005, vol. 34, No. 5, pp. 666-667.

(Continued)

*Primary Examiner* — Zhongqing Wei
(74) *Attorney, Agent, or Firm* — Birch, Stewart, Kolasch & Birch, LLP (57) ABSTRACT

A positive electrode active material for a lithium secondary battery, including a sulfur-carbon composite and a coating layer located on a surface of the sulfur-carbon composite and including a carbon nanostructure and iron oxyhydroxynitrate.

12 Claims, 6 Drawing Sheets

(56) References Cited

U.S. PATENT DOCUMENTS

| | | |
|---|---|---|
| 2018/0351166 A1 | 12/2018 | Chen et al. |
| 2019/0123377 A1 | 4/2019 | Yang et al. |
| 2019/0245203 A1 | 8/2019 | Cho et al. |
| 2019/0267625 A1 | 8/2019 | Lee et al. |

FOREIGN PATENT DOCUMENTS

| | | |
|---|---|---|
| CN | 103474633 A | 12/2013 |
| CN | 104577080 B | 2/2017 |
| CN | 106654439 A | 5/2017 |
| CN | 106082351 B | 4/2018 |
| CN | 109314228 A | 2/2019 |
| JP | 8-295518 A | 11/1996 |
| JP | 2002-110221 A | 4/2002 |
| JP | 2002-248348 A | 9/2002 |
| JP | 2003-135579 A | 5/2003 |
| JP | 2013-77426 A | 4/2013 |
| KR | 10-1998-046770 A | 9/1998 |
| KR | 10-0270077 B1 | 10/2000 |
| KR | 10-2006-0054515 A | 5/2006 |
| KR | 10-2014-0116397 A | 10/2014 |
| KR | 10-2015-0135961 A | 12/2015 |
| KR | 10-2016-0037084 A | 4/2016 |
| KR | 10-1683963 B1 | 12/2016 |
| KR | 10-2017-0001374 A | 1/2017 |
| KR | 10-2017-0035817 A | 3/2017 |
| KR | 10-1737217 B1 | 5/2017 |
| KR | 10-2017-0141130 A | 12/2017 |
| KR | 10-2018-0061034 A | 6/2018 |
| KR | 10-2018-0080316 A | 7/2018 |
| KR | 10-2018-0102406 A | 9/2018 |
| KR | 10-1930395 B1 | 12/2018 |
| KR | 10-2020-0006279 A | 1/2020 |
| KR | 10-2020-0008437 A | 1/2020 |
| WO | WO 2017/109014 A1 | 6/2017 |
| WO | WO 2017/127674 A1 | 7/2017 |
| WO | WO 2017/082338 A1 | 8/2018 |

OTHER PUBLICATIONS

International Search Report for PCT/KR2020/001639 dated May 25, 2020.

Jia et al., "Facile one-pot synthesis of lepidocrocite ($\gamma$-FeOOH) nanoflakes for water treatment", New J. Chem., 2013, vol. 37, pp. 2551-2556.

Schwertmann et a., "Brief Communication A New Iron(III) Oxyhydroxynitrate", Journal of Solid State Chemistry, 1996, vol. 126, No. 0346, p. 336.

Silva et al., "Magnetic and Structural Properties of Iron Oxyhydroxynitrate Nanoparticles", Nanospain 2008, Nanoiberian Conference, Apr. 14-18, 2008, total 2 pages.

Silva et al., "Magnetic behavior of iron (III) oxyhydroxy nanoparticles in organic-inorganic hybrid matrices", Journal of Magnetism and Magnetic Materials 290-291, 2005, pp. 962-965.

Silva et al., "Matrix assisted formation of ferrihydrite nanoparticles in a siloxane/poly(oxyethylene) nanohybrid", Journal of Materials Chemistry, 2005, vol. 15, No. 4, pp. 484-490.

Extended European Search Report for European Application No. 20756587.0, dated Oct. 6, 2021.

CATHODE ACTIVE MATERIAL FOR LITHIUM SECONDARY BATTERY

TECHNICAL FIELD

The present invention relates to a positive electrode active material for a lithium secondary battery comprising a coating layer.

The present application claims the benefit of priority based on Korean Patent Application No. 10-2019-0016495 filed on Feb. 13, 2019, all the contents of which are incorporated herein by reference.

BACKGROUND ART

Secondary batteries have become important electronic components for portable electronic devices since the 1990s as an electric storage device capable of continuous charging and discharging unlike the primary battery which can only discharge once. In particular, since a lithium ion secondary battery was commercialized by Sony Corporation in Japan in 1992, it has led to the information age as a key component of portable electronic devices such as smart phones, digital cameras, and notebook computers.

In recent years, lithium ion secondary batteries are rapidly growing in demand from electric sources of cleaner and power tool, and medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and electric power storage systems (ESS), while further widening application area.

However, the lithium secondary battery, which has the best characteristics among the secondary batteries known to date, also has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the capacity of the battery is determined by the positive and negative electrode materials, the lithium ion secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important. One of the biggest constraints to the sale of electric vehicles is that the distance that can be traveled after charging once is much shorter than those of ordinary gasoline engine vehicles.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur battery is a new high capacity and low-cost battery system which goes beyond capacity limits determined by the intercalation/deintercalation reaction of lithium ions to the layered structure of the metal oxide and graphite which is the basic principle of existing lithium ion secondary battery, and which can lead to replacement of transition metals and cost savings.

The lithium-sulfur battery has a theoretical capacity of 1,675 mAh/g derived from a conversion reaction of lithium ion and sulfur ($S_8+16Li^++16e^-\rightarrow 8Li_2S$) in the positive electrode, and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the energy theoretical energy density of 400 Wh/kg of commercially available lithium secondary battery ($LiCoO_2$/graphite) which uses layered metal oxides and graphite.

After the lithium-sulfur battery was found to be able to dramatically improve battery performance through the formation of nanocomposites around 2010, the lithium-sulfur secondary battery is attracting attention as a new high capacity, eco-friendly, low-cost lithium secondary battery and is currently being studied intensively around the world as a next-generation battery system.

One of the main problems of the lithium-sulfur battery revealed to date is that since sulfur has an electrical conductivity of about $5.0\times10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball-milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with an electrically conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8 \rightarrow Li_2S_8 \rightarrow (Li_2S_6) \rightarrow Li_2S_4 \rightarrow Li_2S_2 \rightarrow Li_2S$ or the like, and among them, $Li_2S_8$ and $Li_2S_4$ (lithium polysulfide), which are long chains of sulfur, are easily dissolved in a general electrolyte used in a lithium ion battery. When this reaction occurs, not only the reversible positive electrode capacity is greatly reduced but also the dissolved lithium polysulfide diffuses into the negative electrode and causes various side reactions.

The lithium polysulfide causes a shuttle reaction especially during the charging process, and as a result, the charging capacity is continuously increased, and the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like.

The method of improving the electrolyte is a method to suppress the shuttle reaction as much as possible by using new electrolytes, such as a functional liquid electrolyte, a polymer electrolyte, and an ionic liquid, which have a novel composition, and thus controlling the dissolution of the polysulfide into the electrolyte or controlling the dispersion rate to the negative electrode through adjustment of the viscosity and the like.

Studies on controlling the shuttle reaction by improving the characteristics of SEI formed on the surface of the negative electrode have been actively carried out. Typically, there is a method of adding an electrolyte additive such as $LiNO_3$ to form an oxide film of $Li_xNO_y$ or $Li_xSO_y$ on the surface of a lithium negative electrode, a method of forming a thick functional SEI layer on the surface of lithium metal, or the like.

Although such efforts are under way, these methods are not only somewhat complicated, but also have a problem that the amount of sulfur that can be added, which is an active material, is limited. Therefore, it is necessary to develop new technologies to solve these problems complexly and to improve the performance of lithium-sulfur battery.

PRIOR ART DOCUMENT

Patent Document (Patent Document 1) Korea Laid-open Patent Publication No. 2015-0135961 (Dec. 4, 2015), "A method for preparing sulfur-carbon complex by dual dry complexation"
(Patent Document 2) Japanese Laid-open Patent Publication No. 2013-077426 (Apr. 25, 2013), "Electrode Forming Material and Uses thereof"

DISCLOSURE

Technical Problem

Therefore, in order to increase the capacity of the battery by solving the problem of leaching of the lithium polysulfide occurring on the positive electrode side of the lithium-sulfur battery, inhibiting the side reaction with the electrolyte solution, and increasing the content of sulfur, the inventors of the present invention have applied a new structure of a coating layer containing a carbon nanostructure and iron oxyhydroxynitrate to the surface of the positive electrode active material, and as a result, it has been confirmed that the battery performance of the lithium-sulfur battery can be improved by solving the above problem, thereby completing the present invention.

Accordingly, it is an object of the present invention to provide a positive electrode active material for a lithium secondary battery that can solve the problem caused by lithium polysulfide.

In addition, it is another object of the present invention to provide a lithium secondary battery with improved battery performance by having the positive electrode described above.

Technical Solution

In order to achieve the above objects, the present invention provides a positive electrode active material for a lithium secondary battery comprising a sulfur-carbon composite; and a coating layer on a surface of the sulfur-carbon composite, which coating layer comprises a carbon nanostructure and iron oxyhydroxynitrate represented by Formula 1 below:

$FeO(NO_3)_x(OH)_{1-x}$ (wherein, $0<x<1$). [Formula 1]

In one embodiment of the present invention, a content of the carbon nanostructure is 1 part by weight to 5 parts by weight relative to 100 parts by weight of the sulfur-carbon composite.

In one embodiment of the present invention, the a content of the iron oxyhydroxynitrate is 0.1 part by weight to 15 parts by weight relative to 100 parts by weight of the sulfur-carbon composite.

In one embodiment of the present invention, the iron oxyhydroxynitrate is in a form of a crystalline particle having a particle diameter of 50 nm to 200 nm.

In one embodiment of the present invention, the iron oxyhydroxynitrate is characterized by having XRD peaks at $2\theta=35.2\pm0.2°$ and $61.3\pm0.2°$, corresponding to (310) and (520) planes, respectively.

In one embodiment of the present invention, the carbon nanostructure is-comprises one or more selected from the group consisting of carbon nanotubes, carbon nanofibers, carbon nanoribbons, carbon nanobelts, carbon nanorods, graphene, graphene oxide, reduced graphene oxide, carbon black, activated carbon, and mesoporous carbon.

In one embodiment of the present invention, a thickness of the coating layer is 500 nm to 2 µm.

In one embodiment of the present invention, the sulfur-carbon composite comprises 70 parts by weight to 90 parts by weight of sulfur relative to 100 parts by weight of the sulfur-carbon composite.

In one embodiment of the present invention, the sulfur-carbon composite is in a form or a particle having a particle diameter of 10 µm to 50 µm.

In addition, the present invention also provides a positive electrode for a lithium secondary battery comprising the positive electrode active material for the lithium secondary battery described above, a binder, and an electrically conductive material.

In addition, the present invention provides a lithium-sulfur battery including the positive electrode described above, a negative electrode, and a separator interposed between the positive electrode and the negative electrode.

In one embodiment of the present invention, the lithium secondary battery is a lithium-sulfur battery.

Advantageous Effects

The positive electrode active material for a lithium secondary battery according to the present invention has the effect of eliminating the problems caused by lithium polysulfide occurring at the positive electrode of the lithium secondary battery and improving electrical conductivity by comprising a coating layer containing carbon nanostructure and iron oxyhydroxynitrate on the surface of the positive electrode active material.

In addition, the lithium-sulfur battery equipped with the positive electrode comprising the positive electrode active material is capable of realizing a battery with high capacity because the capacity of sulfur is not lowered, and stably applying sulfur with high loading, and also improving the stability of the battery because there is no problem such as the short circuit and heat generation of the battery. In addition, the lithium secondary battery has an advantage that the charging/discharging efficiency of the battery is high and the lifetime characteristics are improved.

BEST MODE

Hereinafter, the present invention will be described in detail with reference to the accompanying drawings so that those skilled in the art can easily carry out the present invention. However, the present invention can be embodied in various different forms, and is not limited thereto.

In the drawings, in order to clearly illustrate the present invention, parts that are not related to the description of the present invention are omitted. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

Positive Electrode Active Material for Lithium Secondary Battery

The positive electrode active material according to an embodiment of the present invention comprises a sulfur-carbon composite, and a coating layer located on the surface of the sulfur-carbon composite and comprising a carbon nanostructure and iron oxyhydroxynitrate represented by Formula 1 below:

FeO(NO$_3$)$_x$(OH)$_{1-x}$ (wherein 0<x<1). [Formula 1]

The lithium-sulfur battery has much higher discharging capacity and theoretical energy density than existing lithium secondary batteries, and is attracting attention as a next-generation secondary battery due to the advantage that sulfur, which is used as a positive electrode active material, is rich in resources, and is cheap and environmentally friendly.

Despite advantages as described above, the lithium-sulfur battery does not realize all of theoretical capacity and energy density in actual operation. The reason for this is that the proportion of sulfur actually participating in the electrochemical redox reaction is very low due to the low lithium ion conductivity of sulfur which is a positive electrode active material. The capacity and efficiency of a lithium-sulfur battery may vary depending on the amount of lithium ions delivered to the positive electrode. Therefore, increasing the lithium ion conductivity of the positive electrode is important for high capacity and high efficiency of the lithium-sulfur battery.

In addition, if sulfur content is increased in the positive electrode for the lithium-sulfur battery to fully realize the theoretical capacity of sulfur, there is also a problem that the lithium-sulfur battery does not operate properly due to the decrease of electrochemical reactivity as the sulfur content increases.

In addition, in the case of the lithium-sulfur battery, the lithium polysulfide formed in the positive electrode during the charging/discharging reaction is lost outside the reaction zone of the positive electrode, resulting in a shuttle phenomenon moving between the positive electrode and the negative electrode. At this time, as lithium sulfide is fixed on the surface of lithium metal by side reaction between lithium polysulfide leached from the positive electrode and lithium metal which is negative electrode, there is a problem that the reaction activity is lowered and lithium ions are unnecessarily consumed, thereby accelerating the deterioration of the efficiency and life of the battery.

Accordingly, the present invention provides a positive electrode active material for a lithium secondary battery, which improves the problem of continuous degradation of the reactivity of the electrode due to the dissolution and the shuttle phenomenon, and the problems of reduced reactivity and reduced discharging capacity with increasing sulfur content, by complementing the disadvantages of the conventional positive electrode of the lithium-sulfur secondary battery.

Specifically, in the case of the positive electrode active material provided in the present invention, a coating layer containing a carbon nanostructure having a function capable of adsorbing lithium polysulfide, and iron oxyhydroxynitrate represented by Formula 1 which is a kind of iron oxide is formed on the sulfur-carbon composite, thereby solving the problems as described above.

In the case of the positive electrode active material of the present invention, since the carbon nanostructure and iron oxyhydroxynitrate contained in the coating layer adsorb the lithium polysulfide generated during the operation of the lithium secondary battery and make lithium polysulfide reusable, the charging/discharging efficiency of the battery can be greatly improved. In addition, there is also an advantage that the carbon nanostructure is located on the surface of the sulfur-carbon composite, thereby greatly improving the electrical conductivity of the positive electrode active material.

The carbon nanostructure may be at least one selected from the group consisting of carbon nanotubes, carbon nanofibers, carbon nanoribbons, carbon nanobelts, carbon nanorods, graphene, graphene oxide, reduced graphene oxide, carbon black, activated carbon and mesoporous carbon. At this time, the carbon nanotubes can be single-wall carbon nanotube (SWCNT), double-wall carbon nanotube (DWCNT), multi-wall carbon nanotubes (MWCNT), rope carbon nanotube, or a combination thereof. The graphene-based carbon material such as graphene, graphene oxide, and reduced graphene oxide may be, but is not limited to, in a sheet or fiber form. The carbon nanotube according to an embodiment of the present invention may have a diameter of 5 to 50 nm and a length of 500 nm to 10 μm. The average diameter and length of the carbon nanotubes can be measured by methods well known to those skilled in the art, and may be, for example, measured by transmission electron microscopy (TEM), high-resolution transmission electron microscopy (HR-TEM), SEM, or field-emission scanning microscope (FE-SEM) photographs and/or may be measured using a measuring device using dynamic light-scattering.

The content of the carbon nanostructure contained in the coating layer may be 1 to 5 parts by weight relative to 100 parts by weight of the sulfur-carbon composite, and preferably 1 to 3 parts by weight relative to 100 parts by weight of the sulfur-carbon composite. If the content of the carbon nanostructure contained in the coating layer is less than 1 part by weight, the adsorption effect for the lithium polysulfide may be insignificant. If the content of the carbon nanostructure exceeds 5 parts by weight, the coating layer may act as a resistor to reduce the efficiency of the battery. Therefore, the content of the carbon nanostructure is appropriately controlled within the above range.

The content of the iron oxyhydroxynitrate represented by Formula 1 contained in the coating layer may be 0.1 to 15 parts by weight, and preferably 1 to 12 parts by weight relative to 100 parts by weight of the sulfur-carbon composite. If the iron oxyhydroxynitrate content is less than 0.1 parts by weight, the adsorption effect of lithium polysulfide may be insignificant. If the content of the iron oxyhydroxynitrate exceeds 15 parts by weight, the electrode capacity is reduced, which is undesirable.

The iron oxyhydroxynitrate may be iron oxyhydroxynitrate prepared by the following preparation method presented in the present invention.

The iron oxyhydroxynitrate according to the present invention can be prepared through the steps of: (1) dissolving $Fe(NO_3)_3 \cdot 9H_2O$ in the mixed solvent of an aqueous solvent and an organic solvent to prepare a $Fe(NO_3)_3 \cdot 9H_2O$ solution; and (2) drying the $Fe(NO_3)_3 \cdot 9H_2O$ solution to obtain a compound represented by the above Formula 1. At this time, the $Fe(NO_3)_3 \cdot 9H_2O$ solution is prepared by dissolving $Fe(NO_3)_3 \cdot 9H_2O$, which is a precursor of iron oxyhydroxynitrate, in the mixed solvent of an aqueous solvent and an organic solvent. The aqueous solvent may be water, preferably double distilled water (DW), or triple deionized water (DIW). The organic solvent may be at least one selected from the group consisting of methanol, ethanol, n-propanol, isopropanol, n-butanol, sec-butanol, tert-butanol, and combinations thereof, preferably ethanol.

The aqueous solvent and the organic solvent may be mixed at a weight ratio of 30:70 to 70:30, specifically, a weight ratio of 40:60 to 60:40, preferably a weight ratio of 50:50. If the ratio of the aqueous solvent exceeds the above range, the iron oxyhydroxynitrate represented by the above Formula 1 may not be produced. Therefore, the aqueous solvent and the organic solvent should be properly mixed in the above range.

The concentration of the $Fe(NO_3)_3 \cdot 9H_2O$ solution may be to 2.5 M, preferably 1.5 to 2.0 M. If the concentration is less than 0.5 M, the evaporation rate of the solution becomes slower and the crystal of the prepared iron oxyhydroxynitrate becomes larger or the preparation yield may be lowered. If the concentration exceeds 2.5 M, the prepared iron oxyhydroxynitrate may be agglomerated and thus the physical properties of iron oxyhydroxynitrate may not be suitable for application as a positive electrode additive for the lithium-sulfur battery.

Next, the iron oxyhydroxynitrate represented by Formula 1 can be prepared by drying the $Fe(NO_3)_3 \cdot 9H_2O$ solution prepared in step (1). The 'drying' is performed under a condition of a temperature equal to or higher than a predetermined temperature, and may include a meaning such as 'heat treatment'.

The drying can be carried out at 70 to 90° C., preferably at 75 to 85° C. In addition, the drying may be carried out for 18 to 36 hours, preferably 20 to 30 hours, in the temperature range described above. If the temperature is lower than the above-mentioned temperature or the drying time is short, the moisture of $Fe(NO_3)_3 \cdot 9H_2O$, which is a reactant, may remain excessively, and then the moisture may be is subjected to a drying process and non-uniformly evaporated, or reaction residues may remain, so that the iron oxyhydroxynitrate represented by Formula 1 according to the present invention may not be synthesized.

In addition, if the temperature exceeds the above-mentioned range or the drying time is long, after the moisture of the reactant $Fe(NO_3)_3 \cdot 9H_2O$ is completely evaporated, the oxidation reaction by drying may progress partially. In this case, the irregular oxidation reaction may occur through the drying process, and the size of the generated particles may be increased and the agglomerated form may be expressed, so that the iron oxyhydroxynitrate of Formula 1 above having the desired physical properties in the present invention may not be synthesized.

For example, when preparing the iron oxyhydroxynitrate, if the aqueous solvent exceeding the above range is used and the drying is carried out at a temperature exceeding the above range (for example, 140 to 160° C.), $Fe_xO_3$ (wherein $1.7<x<2.0$) instead of the iron oxyhydroxynitrate represented by the above Formula 1 may be produced. In addition, if the organic solvent exceeding the above range is used and the drying is carried out at a temperature exceeding the above range (for example, 140 to 160° C.), $Fe_2O_3$ instead of the iron oxyhydroxynitrate represented by the above Formula 1 may be partially produced. Therefore, the drying temperature is appropriately adjusted in the above drying temperature range.

The pre-treatment step for drying may be carried out using a convection oven in an environment where sufficient air is introduced.

In the above Formula 1, x may vary depending on the drying time and temperature, and preferably may be $0.5 \leq x < 1$, more preferably $0.7 \leq x < 1$. The lower the value of x in the above Formula 1 is, the lower the stability of the produced iron oxyhydroxynitrate is. In addition, as the temperature in the drying step rises, the hydroxyl (OH) functional groups contained in the iron oxyhydroxynitrate are thermally decomposed and converted to water ($H_2O$), so that the structure of the iron oxyhydroxynitrate can be collapsed. In addition, when it is applied to the lithium-sulfur battery, it is not preferable because water ($H_2O$) is electrolyzed during the charging/discharging of the battery, and thus hydrogen gas ($H_2(g)$) may be generated.

The iron oxyhydroxynitrate prepared by the preparation method is a crystalline particle, and its particle diameter may be 50 to 200 nm, preferably 100 to 150 nm. As the particle diameter decreases within this range, it is suitable as a positive electrode material for the lithium secondary battery. If the particle diameter exceeds the above range, it is not suitable as an additive for the positive electrode of the lithium secondary battery.

In one embodiment of the present invention, the iron oxyhydroxynitrate may have XRD peaks of $2\theta=35.2\pm0.2°$ and 61.3±0.2° corresponding to (310) and (520) planes, respectively, by X-ray diffraction analysis using CuKα ray.

The thickness of the coating layer according to an embodiment of the present invention may be 500 nm to 2 μm. If the thickness of the coating layer is less than 500 nm, the adsorption effect of lithium polysulfide may be insignificant, and thus the improvement effect of charging/discharging efficiency and lifetime characteristics of the battery may be lowered. If the thickness of the coating layer is more than 2 μm, the electrochemical properties of the lithium secondary battery may be lowered due to this increase in resistance, and the efficiency of the battery may be reduced. Therefore, the thickness of the coating layer is appropriately adjusted in this range.

In one embodiment, the sulfur-carbon composite may contain 70 to 90 parts by weight of sulfur, preferably 75 to 90 parts by weight of sulfur, more preferably 80 to 90 parts by weight of sulfur, based on 100 parts by weight of the sulfur-carbon composite. If the content of sulfur is less than the weight ratio range, as the content of the porous carbonaceous material increases, the amount of binder added required to prepare the slurry for the positive electrode increases. The increase in the addition amount of the binder may eventually increase the sheet resistance of the electrode, and thus may act as an insulator to prevent electron pass, thereby deteriorating the cell performance. On the contrary, if the content of sulfur exceeds the above weight ratio range, a self-aggregation phenomenon of sulfur may occur, and electrons may become difficult to directly participate in the electrode reaction due to acceptance problems. Therefore, the sulfur content is properly adjusted within the above range.

The sulfur of the sulfur-carbon composite according to the present invention may be at least one selected from the group consisting of inorganic sulfur ($S_8$), $Li_2S_n$ ($n≥1$), organic sulfur compound and carbon-sulfur polymer [$(C_2S_x)_n$, $x=2.5$ to $50$, $n≥2$]. Preferably, inorganic sulfur ($S_8$) can be used.

In addition, the carbon of the sulfur-carbon composite according to the present invention may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon, and its shape can be used without restriction as long as it is commonly used in the lithium-sulfur battery in the form of sphere, rod, needle, plate, tube, or bulk.

The sulfur-carbon composite may have a particle size of 10 to 50 μm. If the particle size of the sulfur-carbon composite is less than 10 μm, there is a problem that the resistance between the particles increases and an overvoltage occurs in the electrode of the lithium-sulfur battery. If the particle size exceeds 50 μm, the surface area per unit weight is reduced, and thus the wetting area with the electrolyte in the electrode and the reaction site with the lithium ion are decreased, and the amount of electron transfer relative to the size of the composite is reduced, so that the reaction can be delayed, and as a result, the discharging capacity of the battery can be reduced. Therefore, the size of the particles is appropriately selected within the above range.

Positive Electrode for Lithium Secondary Battery

The present invention provides a positive electrode for a lithium secondary battery comprising the positive electrode active material described above. Specifically, the positive electrode for the lithium secondary battery according to the present invention may comprises the positive electrode active material for the lithium secondary battery described above, a binder, and an electrically conductive material.

The positive electrode may be prepared by a conventional method known in the art. For example, the positive electrode can be prepared by mixing and stirring a solvent, if necessary, a binder, an electrically conductive material, and a dispersant in a positive electrode active material to prepare a slurry, then applying (coating) the slurry to a current collector of a metal material, compressing and drying it.

Specifically, in order to impart additional conductivity to the prepared positive electrode active material, an electrically conductive material may be added to the positive electrode composition. The electrically conductive material plays a role in allowing electrons to move smoothly in the positive electrode, and is not particularly limited as long as it is excellent in conductivity and can provide a large surface area without causing chemical change in the battery, but preferably a carbon-based material is used.

The carbon-based material may be one selected from the group consisting of graphite-based materials such as natural graphite, artificial graphite, expanded graphite, and graphene, activated carbon-based material, carbon black-based materials such as channel black, furnace black, thermal black, contact black, lamp black, and acetylene black; carbon fiber-based materials, carbon nanostructures such as carbon nanotubes (CNT) and fullerene, and mixtures thereof.

In addition to the carbon-based materials, metallic fibers such as metal mesh; metallic powder such as copper (Cu), silver (Ag), nickel (Ni), and aluminum (Al); or organic conductive materials such as polyphenylene derivatives can also be used depending on the purpose. The electrically conductive materials may be used alone or in combination.

In addition, the binder may be further added to the positive electrode composition to provide adhesive force to the current collector with the positive electrode active material. The binder should be well dissolved in the solvent, and should not only constitute the conductive network between the positive electrode active material and the electrically conductive material, but also have a proper impregnation property for the electrolyte solution.

The binder applicable to the present invention may be any binder known in the art, and specifically may be, but is not limited to, at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders, polyester-based binders, and silane-based binders, or mixtures or copolymers of two or more thereof.

The content of the binder resin may be, but is not limited to, 0.5 to 30% by weight based on the total weight of the positive electrode for the lithium-sulfur battery. If the content of the binder resin is less than 0.5% by weight, the physical properties of the positive electrode may be deteriorated and thus positive electrode active material and the electrically conductive material can be broken away. If the content exceeds 30% by weight, the ratio of the active material and the electrically conductive material in the positive electrode is relatively reduced and thus the battery capacity can be reduced.

The solvent for preparing the positive electrode composition for the lithium secondary battery in a slurry state should be easy to dry and should dissolve the binder well, and the solvent capable of keeping the positive electrode active material and the conductive material in a dispersed state without dissolving them is most preferable. If the solvent dissolves the positive electrode active material, since the specific gravity (D=2.07) of sulfur in the slurry is high, sulfur is submerged in the slurry and thus sulfur is concentrated in the current collector during the coating process and thus there is a tendency that problems occur in the conductive network, thereby occurring problems in the operation of the battery.

The solvent may be water or an organic solvent, and the organic solvent may be an organic solvent comprising at least one selected from the group consisting of dimethylformamide, isopropyl alcohol, acetonitrile, methanol, ethanol, and tetrahydrofuran.

The positive electrode composition may be mixed by stirring by a conventional method using conventional mixers such as a paste mixer, a high-speed shear mixer, a homomixer, or the like.

The positive electrode composition may be applied to a current collector and vacuum dried to form a positive electrode for a lithium secondary battery. The slurry can be coated on the current collector in an appropriate thickness depending on the viscosity of the slurry and the thickness of the positive electrode to be formed, and can be appropriately selected within a range of preferably 10 to 300 μm.

In this case, there is no limitation on the method of coating the slurry, and the method of coating the slurry may comprise, for example, a doctor blade coating, a dip coating, a gravure coating, a slit die coating, a spin coating, a comma coating, a bar coating, a reverse roll coating, a screen coating, a cap coating method and the like.

The positive electrode current collector generally can be made in a thickness of 3 to 500 μm and is not particularly limited as long as it has high electrical conductivity without causing chemical changes in the battery. For example, an electrically conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

Lithium Secondary Battery

In one embodiment of the present invention, the lithium secondary battery may comprise the positive electrode for the lithium secondary battery described above; a negative electrode comprising lithium metal or lithium alloy as a negative electrode active material; a separator interposed between the positive electrode and the negative electrode; and an electrolyte which is impregnated in the negative electrode, the positive electrode, and the separator and contains a lithium salt and an organic solvent.

The lithium secondary battery according to one embodiment of the present invention may be a lithium-sulfur battery comprising sulfur as a positive electrode active material.

The negative electrode may comprise a material capable of reversibly intercalating or deintercalating lithium ion (Li+), a material capable of reacting with lithium ion to reversibly form a lithium-containing compound, lithium metal, or a lithium alloy as a negative electrode active material. The material capable of reversibly intercalating or deintercalating lithium ion may be, for example, crystalline carbon, amorphous carbon, or mixtures thereof. The material capable of reacting with lithium ion to reversibly form the lithium-containing compound may be, for example, tin oxide, titanium nitrate, or silicon. The lithium alloy may be, for example, an alloy of lithium and the metal selected from the group consisting of Na, K, Rb, Cs, Fr, Be, Mg, Ca, Sr, Ba, Ra, Al, and Sn.

Also, in the process of charging/discharging the lithium secondary battery, sulfur used as a positive electrode active material can be changed to an inactive material and then attached to the surface of the lithium negative electrode. As mentioned above, the inactive sulfur means sulfur which is no longer able to participate in the electrochemical reaction of the positive electrode through various electrochemical or chemical reaction. The inactive sulfur formed on the surface of the lithium negative electrode also has the advantage of acting as a protective layer of the lithium negative electrode. Therefore, the lithium metal and the inactive sulfur formed on the lithium metal, such as lithium sulfide, may be used as a negative electrode.

The negative electrode of the present invention may further comprise a pretreatment layer made of a lithium ion conductive material, and a lithium metal protective layer formed on the pretreatment layer, in addition to the negative electrode active material.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the state of solid may comprise less than about 20 wt. % of non-aqueous organic solvent. In this case, an appropriate gelling agent may be further comprised to reduce the fluidity of the organic solvent. Representative examples of such gelling agent may comprise polyethylene oxide, polyvinylidene fluoride, polyacrylonitrile, etc.

The electrolyte impregnated in the negative electrode, the positive electrode, and the separator is composed of a lithium salt and an electrolyte solution as a non-aqueous electrolyte containing a lithium salt. Non-aqueous organic solvent, organic solid electrolyte, inorganic solid electrolyte, etc., are used as the electrolyte solution.

The lithium salt of the present invention is a substance which can be easily dissolved in a non-aqueous organic solvent, and for example, may comprise at least one selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, lithium chloroborane, lithium lower aliphatic carboxylate, lithium tetraphenyl borate, lithium imide, and combinations thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion (Lit) may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dim ethyl sulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as Li 3 N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy, and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and FEC (fluoro-ethylene carbonate), PRS (propene sultone), FPC (fluoro-propylene carbonate) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrode.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed it in a battery case. Thereafter, a lithium secondary battery is manufactured by injecting an electrolyte solution into the upper part of the case and sealing it with a cap plate and a gasket.

The lithium secondary battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

Hereinafter, the present invention will be described in more detail with reference to the examples and the like. However, the scope and content of the present invention cannot be construed as narrowing down or limiting the invention by way of example and the like. Also, it will be apparent on the basis of the disclosures of the present invention, comprising the following examples that the present invention, in which experimental results are not specifically shown, can be easily carried out by those skilled in the art and that such modifications and variations are intended to fall within the scope of the appended claims.

Preparatory Example: Preparation of Iron Oxyhydroxynitrate 75 g of Fe(NO$_3$)$_3$·9H$_2$O (Sigma-Aldrich company) was dissolved in a mixed solvent of 100 g of deionized water (DIW) and 100 g of ethanol to prepare a 1.8 M solution. The prepared solution was put in a glass bath, air was sufficiently injected in a convection oven, and dried at for 24 hours to prepare iron oxyhydroxynitrate of Formula, FeO(NO$_3$)$_x$(OH)$_{1-x}$ (wherein, 0.5≤x<1).

Preparation Example: Preparation of Positive Electrode Active Material (1) First, 80 g of sulfur and 20 g of carbon nanotubes were mixed and heat-treated in a convection oven at 155 for 1 hour to prepare a sulfur-carbon composite.

Figure 1:
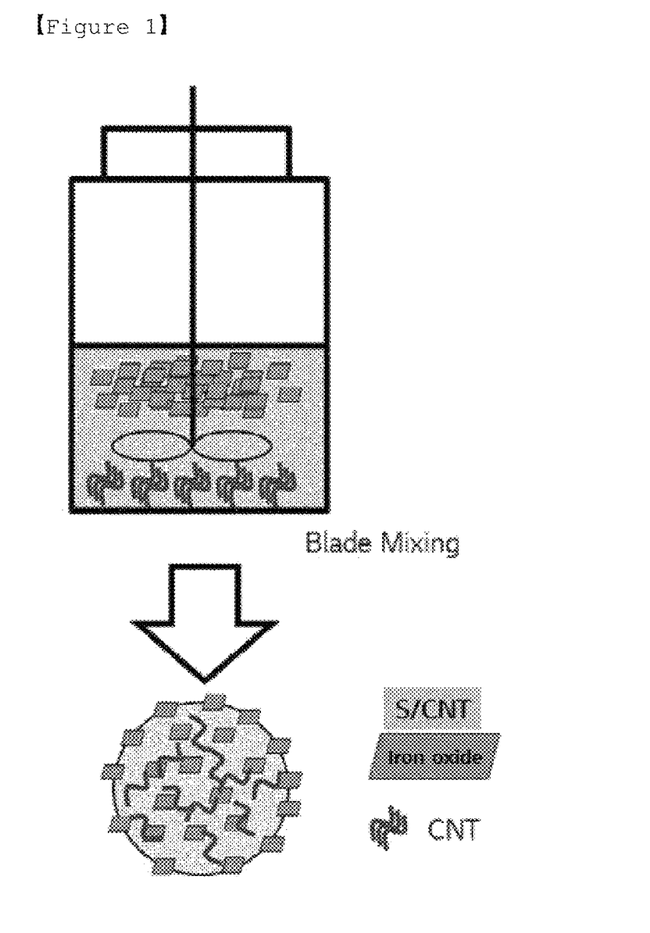
FIG. 1 shows a schematic diagram of the preparing process of the positive electrode active material according to the present invention.

(2) 88 g of the sulfur-carbon composite prepared above, 2 g of carbon nanotubes as a carbon nanostructure, and 10 g of iron oxyhydroxynitrate prepared in the Preparatory Example were added to 200 g of ethanol to prepare a mixed solution. The mixed solution was blade-mixed at a speed of 1,500 rpm for 1 hour to form a coating layer containing carbon nanotubes and iron oxyhydroxynitrate on the surface of the sulfur-carbon composite (see FIG. 1). During the blade-mixing, nitrogen gas was continuously added to dry all of the ethanol solvent.

(3) Thereafter, the obtained product was dried at 80 for 18 hours in a convection oven to prepare a positive electrode active material having a coating layer formed on the surface of the sulfur-carbon composite.

Comparative Preparation Example 1: Preparation of Positive Electrode Active Material 80 g of sulfur and 20 g of carbon nanotubes were mixed and heat treated at 155 for 1 hour to prepare a positive electrode active material of sulfur-carbon composite having no coating layer formed on its surface.

Comparative Preparation Example 2: Preparation of Positive Electrode Active Material A positive electrode active material was prepared in the same manner as in Preparation Example, except that in the step of preparing a mixed solution according to step (2) of the Preparation Example, 98 g of sulfur-carbon composite is added and iron oxyhydroxynitrate prepared in the Preparatory Example is not added.

Example 1: Manufacturing of Lithium-Sulfur Battery 88 parts by weight of the positive electrode active material prepared in the above Preparation Example, 5 parts by weight of VGCF (Vapor Grown Carbon Fiber) as an electrically conductive material, and 7 parts by weight of lithiated polyacrylamide (LiPAA)/polyvinylalcohol (PVA) (LiPAA/PVA: 6.5:0.5) as a binder were added to de-ionized water (DIW) as a solvent, and mixed to prepare a slurry composition for positive electrode active material.

Subsequently, the prepared slurry composition was coated on a current collector (Al Foil, 20 μm) and dried at 50° C. for 12 hours to prepare a positive electrode for a lithium-sulfur battery. At this time, the loading amount was 3.5 mAh/cm$^2$, and the porosity of the electrode was 60%.

Thereafter, a coin cell of a lithium-sulfur battery comprising the positive electrode manufactured according to the above, lithium metal as a negative electrode, a separator and an electrolyte. A mixed solution comprising 1.0 M of LiN(CF$_3$SO$_2$)$_2$ (LiFSI) and 0.1M of LiNO$_3$ in a non-aqueous organic solvent having a composition of 1:1:1 by volume of 2-methyltetrahydrofuran (THF), dioxolane (DOL) and dimethyl ether (DME) was used as an electrolytic solution. Specifically, the positive electrode was prepared by drawing into a 14 phi circular electrode, the polyethylene (PE) separator was prepared by drawing into a 19 phi, and the negative electrode was prepared by drawing the 150 μm lithium metal into a 16 phi.

Comparative Example 1: Manufacturing of Lithium-Sulfur Battery

A lithium-sulfur battery was prepared in the same manner as in Example 1, except that 88 parts by weight of sulfur-carbon composite having no coating layer prepared in Comparative Preparation Example 1 as a positive electrode active material is used.

Comparative Example 2: Manufacturing of Lithium-Sulfur Battery

A lithium-sulfur battery was prepared in the same manner as in Example 1, except that 88 parts by weight of sulfur-carbon composite containing no iron oxyhydroxynitrate in the coating layer prepared in Comparative Preparation Example 2 is used as a positive electrode active material.

Experimental Example 1: Scanning Electron Microscope (SEM) Analysis

The positive electrode active materials according to Preparation Example and Comparative Preparation Examples 1 to 2 were each subjected to SEM analysis (S-4800 FE-SEM from Hitachi company) at a magnification of 20k.

Figure 2:
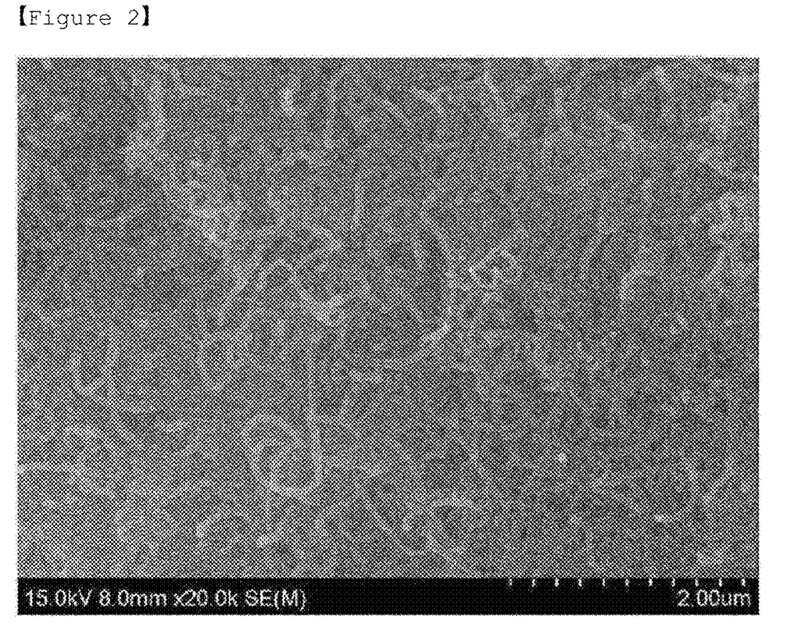
FIG. 2 shows a scanning electron microscope (SEM) image of the positive electrode active material according to Comparative Preparation Example 1 of the present invention.
Figure 3:
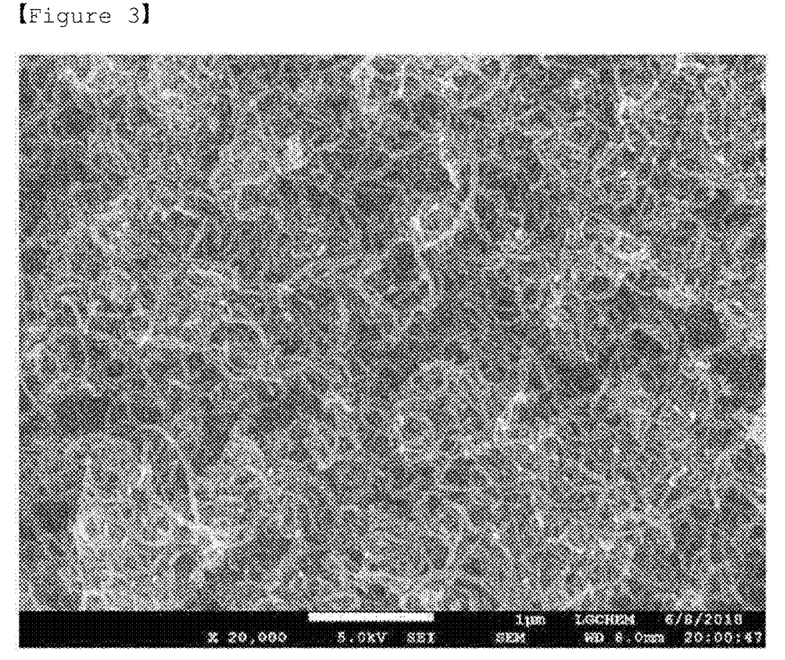
FIG. 3 shows a scanning electron microscope (SEM) image of the positive electrode active material according to Comparative Preparation Example 2 of the present invention.
Figure 4:
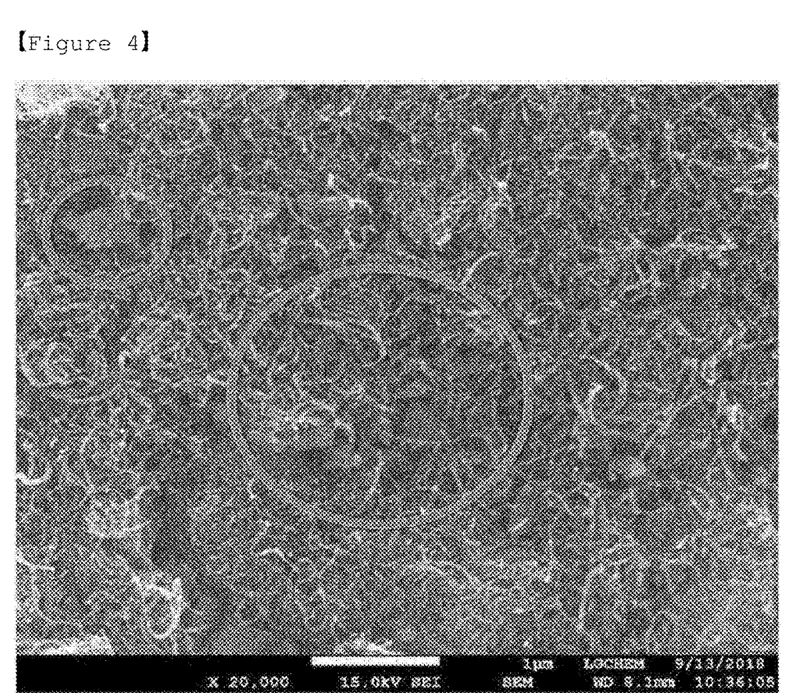
FIG. 4 shows a scanning electron microscope (SEM) image of the positive electrode active material according to the preparation example of the present invention.

FIGS. 2 to 3 are SEM images of the positive electrode active materials according to Comparative Preparation Examples 1 and 2, respectively, and FIG. 4 is a SEM image of the Preparation Example.

In the case of FIG. 2 according to Comparative Preparation Example 1 of the present invention, it was confirmed that the coating layer is not formed on the positive electrode active material, and thus the surface of the sulfur-carbon composite is exposed.

In the case of FIG. 3 according to Comparative Preparation Example 2 of the present invention, it was confirmed that although the surface of the sulfur-carbon composite was not exposed due to the coating layer of carbon nanotubes, iron oxyhydroxynitrate according to the present invention is not contained in the coating layer.

In the case of FIG. 4 according to Preparation Example of the present invention, it was confirmed that a coating layer containing crystalline iron oxyhydroxynitrate particles and carbon nanotubes is formed on the surface of the positive electrode active material.

Experimental Example 2. X-Ray Diffraction (XRD) Analysis

The iron oxyhydroxynitrate prepared in Preparation Example was subjected to XRD analysis (D4 Endeavor from Bruker company).

Figure 5:
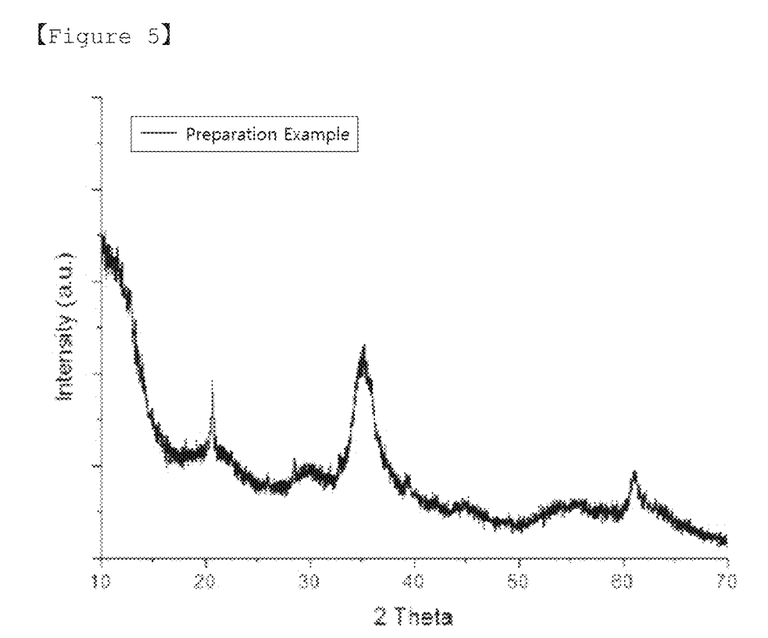
FIG. 5 shows the results of X-ray diffraction analysis (XRD) of iron oxyhydroxynitrate (FeO(NO$_3$)$_x$(OH)$_{1-x}$) according to Preparatory Example of the present invention.

FIG. 5 is a graph showing the XRD analysis of the iron oxyhydroxynitrate prepared in Preparatory Example.

Referring to FIG. 5, the XRD peaks of the (310) and (520) planes were 2θ=35.2±0.2° and 61.3±0.2°, respectively, and thus it was confirmed that iron oxyhydroxynitrate of the pure phase according to the present invention was prepared.

Experimental Example 3. Comparative Experiment of Discharging Capacity of Lithium-Sulfur Battery For the coin cells prepared in Example 1 and Comparative Examples 1 and 2, discharging capacity at a charge current of 0.1 C and a voltage of 1.8 to 2.5V was measured, and the results are shown in FIG. 6.

Figure 6:
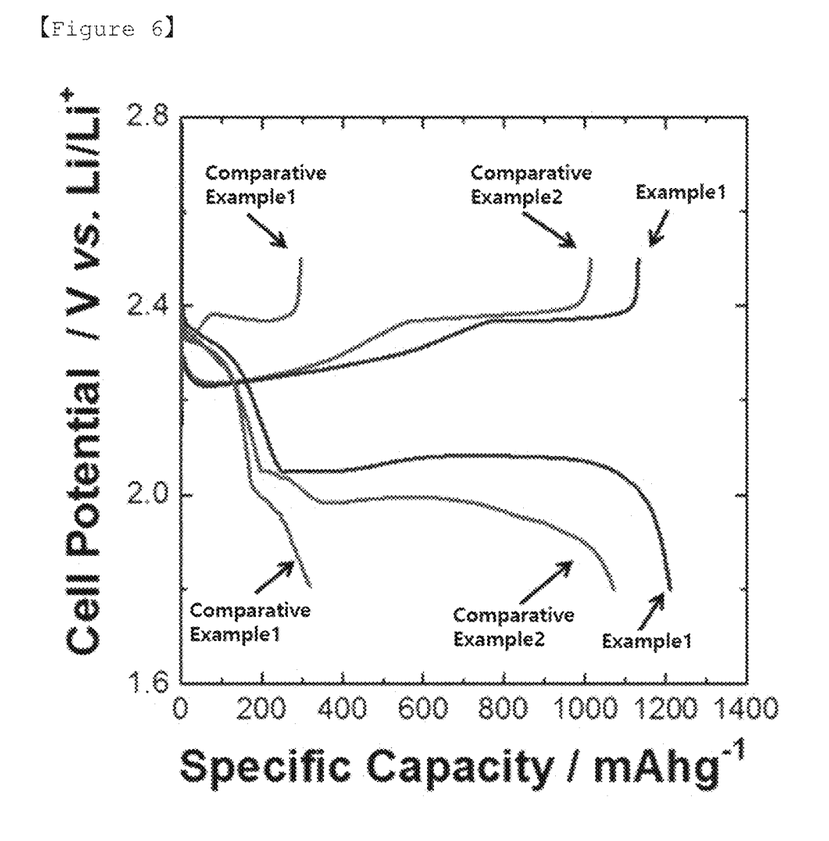
FIG. 6 shows the results of the measurement of the discharging capacity of the lithium-sulfur batteries comprising the positive electrode active materials according to the example and the comparative examples of the present invention.
Figure 7:
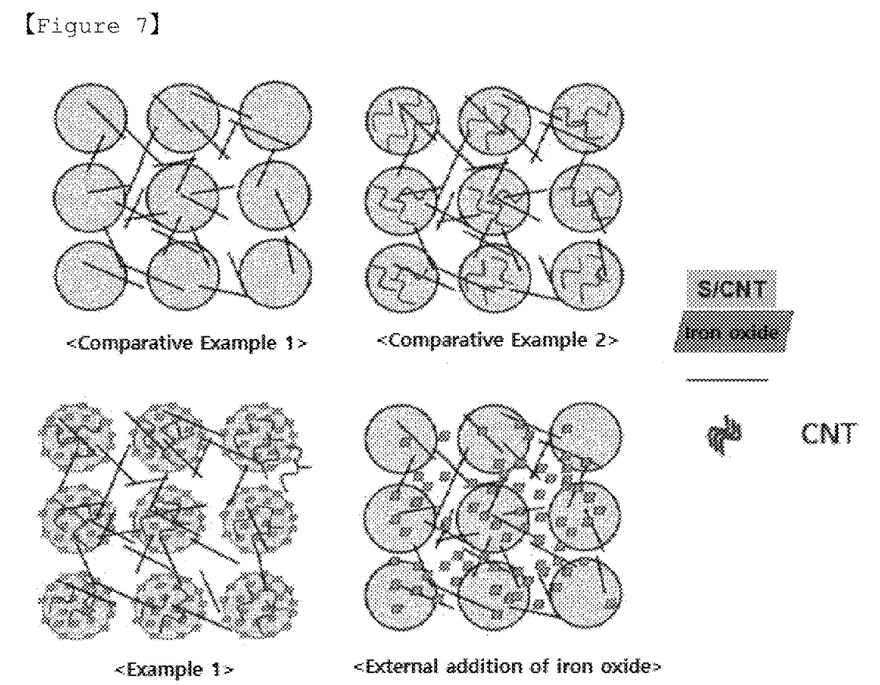
FIG. 7 is a schematic diagram of positive electrode active materials according to the example and the comparative examples of the present invention.

As shown in FIG. 6, the lithium-sulfur battery according to Comparative Example 2 was found to have an improved discharging capacity compared to the battery according to Comparative Example 1 including a positive electrode active material in which no coating layer was formed.

In addition, it can be seen that in the case of Example 1, despite the high loading of sulfur contained in the positive electrode (80% by weight) compared to Comparative Examples 1 and 2, the battery was not reduced in reactivity and stable operation was performed, and that since carbon nanotubes and iron oxyhydroxynitrate were comprised in the coating layer to easily participate in the reaction during the charging/discharging process, the overvoltage was improved and the discharge capacity was further improved as compared to the lithium-sulfur battery according to Comparative Example 2.

The invention claimed is:

1. A positive electrode active material for a lithium secondary battery comprising:
   a sulfur-carbon composite; and
   a coating layer on a surface of the sulfur-carbon composite, wherein the coating layer comprises a carbon nanostructure and iron oxyhydroxynitrate represented by Formula 1 below:

$$FeO(NO_3)_x(OH)_{1-x} \quad \text{[Formula 1]}$$

wherein 0<x<1.

2. The positive electrode active material for the lithium secondary battery according to claim 1, wherein a content of the carbon nanostructure is 1 part by weight to 5 parts by weight relative to 100 parts by weight of the sulfur-carbon composite.

3. The positive electrode active material for the lithium secondary battery according to claim 1, wherein a content of the iron oxyhydroxynitrate is 0.1 part by weight to 15 parts by weight relative to 100 parts by weight of the sulfur-carbon composite.

4. The positive electrode active material for the lithium secondary battery according to claim 1, wherein the iron oxyhydroxynitrate is in a form of a crystalline particle having a particle diameter of 50 nm to 200 nm.

5. The positive electrode active material for the lithium secondary battery according to claim 1, wherein the iron oxyhydroxynitrate is characterized by having XRD peaks of 2θ=35.2±0.2° and 61.3±0.2° corresponding to (310) and (520) planes, respectively.

6. The positive electrode active material for the lithium secondary battery according to claim 1, wherein the carbon nanostructure comprises at least one selected from the group consisting of carbon nanotubes, carbon nanofibers, carbon nanoribbons, carbon nanobelts, carbon nanorods, graphene, graphene oxide, reduced graphene oxide, carbon black, activated carbon, and mesoporous carbon.

7. The positive electrode active material for the lithium secondary battery according to claim 1, wherein a thickness of the coating layer is 500 nm to 2 μm.

8. The positive electrode active material for the lithium secondary battery according to claim 1, wherein the sulfur-carbon composite comprises 70 parts by weight to 90 parts by weight of sulfur relative to 100 parts by weight of the sulfur-carbon composite.

9. The positive electrode active material for the lithium secondary battery according to claim 1, wherein the sulfur-carbon composite is in a form of a particle having a particle diameter of 10 μm to 50 μm.

10. A positive electrode for a lithium secondary battery comprising the positive electrode active material according to claim 1, a binder, and an electrically conductive material.

11. A lithium secondary battery comprising the positive electrode according to claim 10; a negative electrode; and a separator interposed between the positive electrode and the negative electrode.

12. The lithium secondary battery according to claim 11, wherein the lithium secondary battery is a lithium-sulfur battery.

* * * * *